United States Patent
Chamayou et al.

(10) Patent No.: US 9,228,032 B2
(45) Date of Patent: Jan. 5, 2016

(54) PROCESS FOR THE GAS PHASE POLYMERISATION OF OLEFINS

(75) Inventors: Jean-Louis Chamayou, Carry le Rouet (FR); Andrew David Bell, Carry le Rouet (FR)

(73) Assignee: INEOS SALES (UK) LIMITED, Lyndhurst, Hampshire (GB)

( * ) Notice: Subject to any disclaimer, the term of this patent is extended or adjusted under 35 U.S.C. 154(b) by 571 days.

(21) Appl. No.: 13/519,717

(22) PCT Filed: Dec. 24, 2010

(86) PCT No.: PCT/EP2010/070728
§ 371 (c)(1),
(2), (4) Date: Jun. 28, 2012

(87) PCT Pub. No.: WO2011/091929
PCT Pub. Date: Aug. 4, 2011

(65) Prior Publication Data
US 2012/0289666 A1  Nov. 15, 2012

(30) Foreign Application Priority Data

Jan. 26, 2010 (EP) .................................. 10151642

(51) Int. Cl.
C08F 210/14 (2006.01)
C08F 2/01 (2006.01)
C08F 10/00 (2006.01)
B01J 8/00 (2006.01)
C08F 210/16 (2006.01)

(52) U.S. Cl.
CPC ............... C08F 10/00 (2013.01); B01J 8/0055 (2013.01); *C08F 210/16* (2013.01)

(58) Field of Classification Search
CPC ............................. C08F 10/00; C08F 210/16
See application file for complete search history.

(56) References Cited

U.S. PATENT DOCUMENTS

| 3,922,322 A | 11/1975 | Roger et al. |
| 4,640,963 A | 2/1987 | Kreider et al. |
| 4,725,409 A | 2/1988 | Wolf |
| 4,882,400 A | 11/1989 | Dumain et al. |
| 5,382,638 A * | 1/1995 | Bontemps et al. ............... 526/67 |
| 6,679,930 B1 | 1/2004 | An et al. |
| 2008/0021178 A1 | 1/2008 | Scott et al. |

FOREIGN PATENT DOCUMENTS

| EP | 1 274 747 B1 | 3/2005 |
| FR | GB 1 413 613 | 11/1975 |
| FR | 2 809 810 A1 | 12/2001 |
| GB | FR 2137441 | 12/1972 |
| JP | 57-128706 | 8/1982 |
| WO | WO 97/14721 A1 | 4/1997 |
| WO | WO 00/32651 A1 | 6/2000 |
| WO | WO 2006/054040 A1 | 5/2006 |
| WO | WO 2008/010911 A1 | 1/2008 |

OTHER PUBLICATIONS

Griffiths, A.J., et al; "The use of centre bodies and de-swirl vanes in the exhaust of cyclone dust separators"; *Part E: Journal of Process Mechanical Engineering*, vol. 210, 11 pgs. (1992).

* cited by examiner

*Primary Examiner* — Robert Harlan
(74) *Attorney, Agent, or Firm* — Nixon & Vanderhye P.C.

(57) ABSTRACT

Process for the gas phase polymerization of olefins, in particular, with recycle of fines to the reaction zone. The process includes (a) polymerizing an olefin in a reaction zone in which a bed of polymer particles is maintained in an agitated state by passing a fluid stream through the bed, (b) withdrawing the fluid stream from the reactor after it has passed through the bed of polymer particles, (c) separating entrained solids from the withdrawn fluid stream, and (d) returning the separated entrained solids to the reaction zone. The polymer production rate of the process is at least 40 tonnes/hour, and the separated solids from step (c) are returned to the lower half of the bed of polymer particles in the reaction zone.

17 Claims, 2 Drawing Sheets

PROCESS FOR THE GAS PHASE POLYMERISATION OF OLEFINS

This application is the U.S. national phase of International Application No. PCT/EP2010/070728 filed 24 Dec. 2010 which designated the U.S. and claims priority to European Application No. 10151642.5 filed 26 Jan. 2010, the entire contents of each of which are hereby incorporated by reference.

The present invention relates to a process for the gas phase polymerisation of olefins, and, in particular, to a process for the gas phase polymerisation of olefins with recycle of fines to the reaction zone.

BACKGROUND OF THE INVENTION

The polymerisation of olefins in the gas phase in fluidised or similar reactors is well-known and commercially operated. In a typical fluidised bed process, for example, a bed of growing polymer particles is maintained in a fluidised state in a vertically orientated cylindrical reactor by means of an ascending gas stream (fluidising gas). Gas exiting the top of the fluidised bed reactor is cooled and recycled to the base via a recycle loop. Fresh monomer(s) are added to replace those consumed in the reaction whilst produced polymer particles are removed from the bed.

GB 1,413,613, for example, describes a process for the dry polymerisation of olefins in a fluidised bed reactor. Two possible configurations are described to address the potential problem of small solid particles, known as "fines", being entrained from the reactor with the ascending gas stream. The first of these is the use of what is referred to in GB 1,413,613 as a "tranquilisation chamber" which is an area of larger cross-section compared to the reactor and provided above the reactor which acts to reduce the velocity of the fluidising gas, allowing solid particles which might otherwise exit the top of the fluidised bed to fall back to the bed. The second is the use of a cyclone to separate the entrained solids for subsequent return to the reactor.

Of the two options disclosed in GB 1,413,613, that referred to as the tranquilisation chamber, which may alternatively and, in fact, is more generally referred to as a disengagement zone or velocity reduction zone, has become the commonly used means for reducing entrainment from fluidised bed reactors. However, despite the use of a disengagement zone, it is common for significant quantities of solids to remain entrained in the fluidising gas exiting the disengagement zone. Such solids may foul components of the line through which the fluidising gas is recycled. To avoid this problem it is therefore known to also use a cyclone in addition to the disengagement zone to separate the entrained solids from the fluidising gas exiting the disengagement zone.

Such processes are described, for example, in U.S. Pat. No. 4,882,400 and U.S. Pat. No. 5,382,638.

U.S. Pat. No. 4,882,400, for example, discloses an apparatus for the gas phase polymerisation of olefins in a fluidised bed reactor comprising a disengagement chamber and a cyclone which acts to separate entrained solids from the fluidising gas exiting the reactor, for recycle to the fluidised bed. According to U.S. Pat. No. 4,882,400, the solids should be recycled to the reactor, below the disengagement chamber but above the top of the fluidised bed. One problem of this process is that it is necessary for the fluidised bed to operate below the height of the cylindrical reactor section.

U.S. Pat. No. 5,382,638 also discloses an apparatus for the gas phase polymerisation of olefins in a fluidised bed reactor comprising a disengagement chamber and a cyclone which acts to separate entrained solids from the fluidising gas exiting the reactor, for recycle to the fluidised bed. According to U.S. Pat. No. 5,382,638, the solids should again be recycled to the upper portion of the reactor body, but in this case may be introduced either above or into the top of the fluidised bed. According to U.S. Pat. No. 5,382,638 recycle of the solids to the lower portion of the bed is less favoured.

SUMMARY OF THE INVENTION

It is apparent from the above that as the technology has advanced to the use of both a disengagement chamber and a cyclone, it has become favoured to recycle the solids (fines) recovered from the cyclone to the top, rather than the base, of the fluidised bed. There are a number of reasons for this, not least of which is that it is technically more difficult to reintroduce the fines at or near the base of the fluidised bed.

It is, of course, generally desired to increase production rates in polymerisation reactions as much as possible to produce as much polymer product.

It has now been found that, and contrary to the general prejudice in the art, when operating polymerisation at high production rates, recycle of fines to the base of the fluidised bed can be particularly advantageous.

Thus, according to a first aspect of the present invention there is provided a process for the gas phase polymerisation of olefins in a gas phase reactor, said process comprising:
  a) polymerising an olefin in a reaction zone in which a bed of polymer particles is maintained in an agitated state by passing a fluid stream through the bed,
  b) withdrawing the fluid stream from the reactor after it has passed through the bed of polymer particles,
  c) separating entrained solids from the withdrawn fluid stream,
  d) returning the separated entrained solids to the reaction zone, said process being characterised in that:
  1) the polymer production rate of the process is at least 40 tonnes/hour, and
  2) the separated solids from step (c) are returned to the lower half of the bed of polymer particles in the reaction zone.

According to a preferred embodiment of the present invention, the process also comprises the additional step of recycling the withdrawn fluid stream to the reaction zone via a recycle loop, said recycle loop comprising at least one stage wherein at least a portion of the withdrawn fluid stream is cooled.

Devices for separating the solids can be any appropriate solid concentrator device, e.g. an elbow concentrater device (e.g. pipe diverter), a filter or a cyclone; a cyclone is the preferred separating device used according to the present invention.

It is a feature of the present invention that the separated solids (also designated as "fines") are returned to the lower half of the bed of polymer particles in the reaction zone. Preferably, the fines are returned to the lower quarter of the bed of polymer particles.

In the process of the present invention generally, the bed of polymer particles are maintained in an "agitated state" by passing a gas through the bed. By "agitated state", as used herein, is meant that the polymer particles move under influence of the gas passing through the bed. It is a feature of such beds that they have an expanded volume compared to the bed "at rest" when no gas or other agitation means is applied. Preferably the agitated bed volume is at least 10% greater than the volume of the bed "at rest". Typically the expanded volume is 10-30% greater than the volume of the bed "at rest".

Particularly preferred examples of agitated states in the process of the present invention are fluidised and sub-fluidised regimes. The bed may, in addition to the gas which passes through the bed, be agitated by further means, such as stirrers.

The reactor typically comprises a grid which acts as the base of the bed of polymer particles and to support the polymer particles when not being maintained in the agitated state, for example if the gas flow is stopped, and through which grid the gas enters into the bed of polymer particles in order to maintain it in said agitated state. For example, in a fluidised bed process this is referred to as a fluidisation grid.

The bed of polymer particles may then be considered to have a height measured from said grid to the top of the agitated bed which can be denoted as "$H_b$". In the present invention, all references to "lower half" of the bed, "lower quarter" etc. are referenced to this height $H_b$. Thus, for example, the separated solids from the cyclone are returned to the reaction zone at a height of less than $0.5 \times H_b$ above the grid, preferably less than $0.25 \times H_b$ above the grid, and most preferably less than $0.1 \times H_b$ above the grid. In general, whilst the separated solids can be returned essentially at, but obviously above, the grid, it is preferred that the separated solids are introduced at a height of at least 0.25 m above the grid, regardless of the bed height. Relative to the height $H_b$ of a typical commercial reactor according to the present invention the separated solids are preferably returned at a height of least $0.01 \times H_b$ above the grid. The man skilled in the art knows how to measure bed heights, eg. by using nucleonic devices or pressure differential measurements. For the purpose of the present invention and appended claims, the bed height is measured by using the pressure measurement method as described in the Perry's Chemical Engineers' Handbook, Seventh Edition, International Edition 1998, page 17-13.

In general, the fluidisation grid is essentially flat and orientated horizontally. Where this is not the case, for example where it is not flat, then any heights defined with respect to the grid, such as the height of the bed, $H_b$, should be measured relative to the highest vertical point of the grid.

Preferably, the bed is a fluidised bed which is maintained in the fluidised state by means of a fluidising gas passing through the bed, and most preferably by said fluidising gas "alone", by which is meant without mechanical stirring or other means to agitate the bed. The reactor then preferably comprises a vertically orientated cylindrical section with a fluidisation grid defining its base and having a height $H_c$ from the fluidisation grid to the top of the cylindrical section, and with a disengagement zone, being an area of expanded cross-section compared to the cylindrical section, connected to the top of the cylindrical section. The gas outlet is then provided at the top of the disengagement zone. The physical reactor is of a fixed size and will have been designed to accommodate a maximum height of polymer bed in the reaction zone during reaction, this being the "designed maximum height" as used herein. (An example of the "designed maximum height" is the height $H_c$ of a cylindrical fluidised bed reactor as described herein. Although the reactor can be operated with a fluidised bed height below this height, and sometimes even above it, the "designed maximum height" is a fixed height.)

According to another embodiment of the present invention, and regardless of the bed height measurement, the separated solids can also be reintroduced into the reactor at a height of less than $0.5 \times H_c$, for example less than $0.4 \times H_c$, or even less than $0.1 \times H_c$; also, said separated solids can be reintroduced into the reactor at a height of more than $0.01 \times H_c$.

In this embodiment of the present invention there is provided a process for the gas phase polymerisation of olefins in a gas phase reactor, said process comprising:

a) polymerising an olefin in a reaction zone comprising a vertically orientated cylindrical section with a fluidisation grid at its base and having a height $H_c$ from the fluidisation grid to the top of the cylindrical section, in which reaction zone a bed of polymer particles is maintained in an agitated state by passing a fluid stream through the bed, b) withdrawing the fluid stream from the reactor after it has passed through the bed of polymer particles, c) separating entrained solids from the withdrawn fluid stream, d) returning the separated entrained solids to the reaction zone, said process being characterised in that:

1) the polymer production rate of the process is at least 40 tonnes/hour, and 2) the separated solids from step (c) are returned to reaction zone at a height of less than $0.5 \times H_c$ The preferred features of this aspect of the invention are generally as described for the first aspect. Generally, it will be apparent that for a particular process the separated solids will usually be reintroduced at a height which is less than $0.5 \times H_b$ and less than $0.5 \times H_c$. The height of the fluidised bed, which corresponds to $H_b$ defined above, may be greater than $H_c$, for example up to $1.2 \times H_c$. Most typically $H_b$ in such a fluidised bed is in the range 0.8 to $1.05 \times H_c$.

The agitating/fluidising gas typically comprises the principal monomer and one or more comonomers, and may also comprise inert gases, such as nitrogen, and other reactive gases, such as hydrogen.

For sake of simplicity, the present invention will hereinafter be generally described with respect to the preferred process for the gas phase polymerisation of olefins using a fluidised bed, but the description may equally be applied to other agitated beds within the scope of the present invention.

The present invention arises from the fact that at high production rates it has been found that a significant differential in the reaction composition can occur within an agitated bed. Previously, it has generally been considered that the agitation and movement within a fluidised bed are such that the fluidised bed could be considered "well-mixed" and therefore of relatively homogeneous composition. Reference in this regard may be made, for example, to WO 00/32651. This document relates to operation of a polymerisation process in a fluidised bed reactor in which the process is controlled to minimise the reaction gradients across the reactor. However, as noted in this document, the fluidised bed itself is generally considered to be well-mixed, and this document is directed to minimising the differences across the entire polymerisation zone.

In contrast, however, it has now been found that whilst this previously held position is a reasonable approximation for processes operated at relatively low production rates, when production rates are increased significant differences in reactant composition can be found even within the fluidised bed, in particular, at different heights within the fluidised bed.

Such differentials in the reaction composition within the bed may be identified by a number of different measurements. Measurements of particular use include the absolute or relative concentrations of particular components at different heights within the fluidised bed, including the use of reaction gradients ($Gr_i$) of particular components between the top and the base of the fluidised bed using an equivalent equation to that used in WO 00/32651, but specifically in respect of differentials within the fluidised bed, preferably between the top and base of the fluidised bed.

In the process of the present invention, as well as in usual commercial operation, "fresh" catalyst is introduced into the lower portion of the fluidised bed, preferably at or near the base of the fluidised bed (by which is meant in the lower quarter of the fluidised bed, preferably in the lowest 15%). Similarly, the recycle loop introduces some or all of the cooled recycle stream, especially at least some, and often all, of the liquid portion thereof if the process is operated in condensed mode, into the lower portion of the fluidised bed, usually at or near the base of the fluidised bed (by which is again meant in the lower quarter of the fluidised bed, preferably in the lowest 15%). In this way, the fresh catalyst and the cooled recycle gas and/or liquid are all introduced into the same (lower) region of the fluidised bed, which allows the maximum cooling effect of the cooled recycle stream to be present in the same region as that at which the most active catalytic particles are present (and hence where the most heat is generated).

However, the rate of fines recycle into a fluidised bed can often be far in excess of the actual catalyst introduction rate. Further, the fines reintroduced into the fluidised bed are usually still active and will undergo further polymerisation within the fluidised bed. When the fines are introduced into or near the top of the fluidised bed and the reaction composition to which they are exposed is significantly different to that to which the fresh catalyst is exposed in the base of the bed, this can lead to production of significantly different polymers compared to other parts of the bed. It has been found that, when operating at high production rates, when fines are introduced at or near (which may be above or below) the top of the fluidised bed, and although the individual fines (particles) are not as active towards polymerisation as fresh catalyst particles, the shear quantity of fines can lead to significant heat being generated in the absence of any liquid or other cooling means. This can lead to significant amounts of agglomeration within the top of the fluidised bed.

One particular issue with introduction of the fines to the base of the bed, and which has also contributed to the previously held prejudice towards injection at the top or above the fluidised bed, is that it is technically (in particular "physically" due to the pressure profile within the reactor, i.e. a higher pressure at the base of the bed) difficult to reintroduce the fines at or near the base of the fluidised bed. Further, the reintroduced fines, being in such large quantities, have the potential to cause significant perturbations in the base of the polymerisation reaction.

In the process of the present invention, preferably the fines are introduced into the fluidised bed continuously, preferably in a carrier (motive) gas. This ensures a more constant effect of the fines reintroduction, minimising perturbations and heat loads compared to intermittent fines introduction (which then occur in greater concentrations during the periods of introduction than obtained with a continuous introduction rate).

The fines are preferably introduced against the pressure in the lower portion of the fluidised bed using a compressor providing a motive gas to inject the fines continuously. The motive gas may be any suitable gas but is preferably a fraction of the cooled loop gas.

The use of a compressor provides improved cyclone/ejector performance, ensures sufficient velocity in the transfer line between the ejector and the reactor inlet, and provides the necessary driving force for penetration of the fines into the fluidised bed to ensure good mixing.

The separated solids from the cyclone may be passed to the compressor motive gas via an ejector, such as described in U.S. Pat. No. 4,882,400 or US 2008/021178.

Any suitable separation device, preferably any cyclone, may be used to separate the entrained solids from the gas exiting the gas outlet of the reactor. An example of a suitable cyclone is that described in EP 1487588. In a preferred embodiment, the cyclone has a cylindrical horizontal internal cross-section, the cross-section being smaller at the bottom of the cyclone than at the top, and which cyclone comprises (1) a gas inlet located in the upper half of the cyclone which provides introduction of the fluidising gas comprising solids in a horizontal direction and tangentially to the cyclone inner wall at its point of introduction, (2) a gas outlet located centrally at the top of the cyclone, and (3) a solids (together with some entrained gas) outlet located centrally at the base of the cyclone, where the gas outlet (2) comprises a cylindrical pipe which extends vertically downwards into the cyclone to a height below the location of the gas inlet, such that the gas entering the cyclone through the gas inlet enters into an annular area between the cyclone wall and the cylindrical pipe forming the gas outlet.

The cyclone may comprise a vortex centraliser in the base of the cyclone. Said vortex centraliser is preferably in the form of an inverted cone. Coperion's Combiflow® could also be potentially used as vortex centraliser. In addition, it is preferred that the cyclone includes, within the cylindrical pipe which forms the gas outlet (2), an insert which reduces gas turbulence and, thereby vibration and pressure drop across the cyclone. Typical examples of such inserts can be found in the Perry's Chemical Engineers' Handbook, Seventh Edition, International Edition 1998, page 17-31. Other examples can be found in U.S. Pat. No. 6,679,930 B1 which discloses laminar flow means provided through the gas outlet passage of a cyclone; rectangular, triangular, elliptical and cylindrical shapes cross blades are specifically disclosed amongst useful laminar flow means.

The process of the present invention is characterised in that the polymer production rate of the process is at least 40 tonnes/hour. Preferably, the production rate is at least 50 tonnes/hour, such as at least 75 tonnes/hour. There is no particular upper limit to the production rate in the process of the present invention, although the production rate would typically be less than 100 tonnes/hour.

The process of the present invention is preferably characterised by a Space Time Yield ("STY") expressed in [kg/(m³×h)] which is at least 100. Said STY can advantageously be higher than 120 kg/(m³×h), higher than 150 kg/(m³×h) and even higher than 200 kg/(m³×h). The STY is well known and represents the weight of polymer produced per unit of time and per unit of Reactor Volume. The Reactor Volume is calculated as $3.1416*D^2*H*¼$ (in m³), wherein D is the cylindrical reactor Diameter (D expressed in m). The weight of polymer production per unit of time is calculated as the average steady (co)monomers feed rate (ignoring therefore the slight fluctuations due to (co)monomers losses, e.g. purges). For the purpose of the present invention and appended claims, for the calculation of the space time yield $H_c$ is used as H value.

The diameter D of the cylindrical reactor as defined hereinabove is preferably of at least 4 meters, e.g. at least 4.3 meters, or even at least 4.5 meters, in particular at least 4.75 meters, or even at least 4.90 meters. Whilst the present invention together with all its embodiments is theoretically applicable to much larger diameter reactors, it is particularly applicable to reactors having a diameter lower than 6 meters, or even lower than 5.5 meters.

According to a preferred embodiment of the present invention, the ratio $H_c/D$ of the cylindrical reactor is higher than 3.75, e.g. higher than 3.90. According to another preferred embodiment of the present invention, the ratio $H_c/D$ of the cylindrical reactor is lower than 5, preferably lower than 4.5, e.g.; lower than 4.20.

Preferably, the process of the present invention is a "condensed mode" polymerisation process, where at least a portion of the total feed introduced to the reactor is provided in the form of a liquid which vaporises inside the fluidised bed. Condensed mode operation is described in, for example, EP 89691, U.S. Pat. No. 4,543,399, U.S. Pat. No. 4,588,790, EP 696293, U.S. Pat. No. 5,405,922, EP 699213 and U.S. Pat. No. 5,541,270.

In particular, the process according to the present invention preferably comprises cooling at least a portion of the gas exiting the cyclone such that at least a portion of the gases are condensed to form a liquid, which liquid is introduced into the reactor. The liquid introduced into the reactor vaporises within the reactor absorbing (and thereby "removing") heat generated by the exothermic polymerisation reaction. A portion or all of the liquid may be introduced into the base of or the lower quarter of the fluidised bed.

The condensed mode operation may be characterised by the amount of liquid introduced into the bed relative to the total gas flow exiting the reactor. Thus, for example, a level of condensation of 10 wt % means that 10 wt % of the total gas flow rate exiting the reactor is reinjected in liquid form.

Preferably, the level of condensation is at least 10 wt %. More preferably, the level of condensation is at least 20 wt %, such as in the range 20 to 50 wt %.

In particular, when operating at levels of condensation of 10 wt % and above it has been found that the variations in reactant composition between the base of the fluidised bed and the top of the fluidised bed are relatively high. More particularly, the gas phase composition above the dense phase zone can have a significantly different comonomer to monomer ratio to that in the lower part of the reactor.

As a particular example, the ratio of comonomer to monomer at the top of the bed may be significantly higher than at the base of the bed, this difference being enhanced by higher production rate. Introduction of the fines, which are catalytically active particles, in the top of the bed, where the ratio of comonomer to monomer is relatively high and also away from the lower half of the bed where the condensed liquid is provided, has been found to have a tendency to produce relatively low density, and therefore low melting point polymer (due to the high comonomer to monomer ratio) which, especially because of the reduced cooling capacity at the top of the bed, can more readily form agglomerates. This phenomenon is particularly important with a Ziegler catalyst system.

The reverse may also occur, and particular processes (utilising particular catalysts) may have a ratio of comonomer to monomer at the top of the bed significantly lower than at the base of the bed. Introduction of the fines, which are catalytically active particles, in the top of the bed, where the ratio of comonomer to monomer is relatively low (and again away from the lower half of the bed where the condensed liquid is provided) can produce a relatively high melting point and high crystallinity polymer. Such polymers are normally produced at relatively high reaction temperatures to avoid particle breakage and attrition. If produced in a reaction otherwise being operated to produce lower density materials, and hence at lower temperatures, this can result in particle attrition and generate static.

The uncondensed gas and (condensed) liquid may be introduced into the fluidised bed in any suitable manner. For example, the mixture of uncondensed gas and liquid obtained from the cooling (condensation) step may be introduced into the reactor as a single stream. Alternatively, the mixture of uncondensed gas and liquid may be split into one or more streams and introduced into the reactor at different points. For example, one or more gaseous portions of the stream may be separated and introduced to the reactor below the fluidisation grid, whilst one or more portions which include the liquid may be introduced above the fluidisation grid, preferably in the lower quarter of the fluidised bed.

In the process of the present invention the effect of the differential in reaction composition between the top and the base of the fluidised bed is minimised by also introducing the fines into the lower half of the fluidised bed so that both the "fresh" catalyst and the recycled fines are introduced into the same region of the fluidised bed, and hence are exposed to the same, or at least a similar, reaction composition, and are also both introduced in the same region of the fluidised bed as the cooled recycle gas, preferably condensed liquid, is provided. However, it is preferred according to the present invention to reintroduce the fines into the reactor via an inlet which is different from the inlet used for the fresh catalyst introduction.

The process of the present invention is particularly advantageous when at least 80% by weight of the entrained solids, such as at least 90% by weight, for example at least 98% by weight and even preferably 99% by weight of said solids are separated, e.g. in a cyclone, and reintroduced in the reactor according to the present invention. The nature of these solids depends on many factors such as e.g. the catalyst and the polymerisation conditions; usually, the entrained solids are characterised by a particles size lower than 200 microns.

The Applicants have also found an additional advantage according to the present invention wherein at least 10% by weight, for example at least 20% by weight, preferably at least 40% by weight of the condensed liquids are reintroduced directly into the bed of polymer particles above the reactor grid. The combination of this liquid reintroduction together with the recycling of the fines according to the present invention have unexpectedly provided additional advantages in term of overall stability of operation of the polymerisation reactor. Said liquid reintroduction is preferably made at a location which is less than $0.5 \times H_c$, for example less than $0.4 \times H_c$, or even less than $0.1 \times H_c$; also, said liquid can be reintroduced into the reactor at a height of more than $0.01 \times H_c$.

It will also be apparent for the man skilled in the art that the return of the separated solids according to the present invention can be done at several locations within the bed; whilst it is possible to design reactor system with from one to more than then fines recycle lines, the Applicants have found that the use of one or two points of recycling is sufficient for operating reactor systems at production rates of 40 to 100 tonnes/hour.

The principal olefin in the process of the present invention is preferably selected form ethylene and propylene, with ethylene being most preferred. As used herein, the principal olefin is the olefin present in the reaction mixture in the highest amount by weight.

The one or more comonomers may be any olefin other than the principal olefin, typically having up to 10 carbon atoms. For avoidance of doubt, ethylene may be a comonomer when propylene is the principal olefin and propylene may be a comonomer when ethylene is the principal olefin. Preferably, the one or more comonomers are selected from 1-olefins having 4 to 10 carbon atoms, such as 1-butene, 1-hexene and 1-octene. Usually, only a single comonomer is deliberately added to the process, although smaller amounts of other olefins may be formed as impurities e.g. via ethylene di- and trimerisation.

Most preferably, the principal olefin is ethylene, which is polymerised with a single 1-olefin selected from 1-butene, 1-hexene and 1-octene.

Any suitable catalyst may be used in the process of the present invention. Examples of suitable catalysts include chromium-type (or "Phillips") catalysts, Ziegler-type catalysts and metallocene-type catalysts.

The catalyst(s) injected into the reactor according to the present invention are preferably non pre-polymerised (e.g. in an upstream separate polymerisation process). If pre-polymerised, it is preferred that the coated catalysts injected in the process according to the present invention have a median particle size lower than 150 microns. Any conventional means for example a Malvern or a mesh sieving technique can be used to measure the median particle size of the (coated) catalyst. For the purposes of the present invention and appended claims, the measurement of the median particle size (D50) was made according to the International Standard ISO 13320:2009 ("Particle size analysis-Laser diffraction methods"). For example, Malvern Instruments' laser diffraction systems can advantageously be used, e.g. a Malvern Mastersizer S or a Malvern Mastersizer 2000; such instrument together with its operating manual meets or even exceeds the requirements set-out within the ISO 13320 Standard. Thus, the D50 of the catalyst, optionally coated, used in the present invention is preferably lower than 150, more preferably lower than 140, most preferably lower than 120 microns.

The present invention is particularly applicable to single site metallocene-type catalysts and Ziegler catalysts. For example, with Ziegler catalysts it has been found that the ratios of comonomer to monomer and hydrogen to comonomer at the top of the fluidised bed can be significantly higher than the same ratios at the base of the bed. If fines are recycled to the top of the bed this leads to significant production of a relatively low density, high Melt Index polymer with low melting point compared to that produced at the base of the bed.

With respect to single site metallocene catalysts, these have a relatively high activity and ability to incorporate "heavier" co-monomers into the polyolefin formed (by which is meant comonomers having a larger molecular weight than the principal olefin) meaning that relatively low concentrations of such comonomers are required in the gas phase to give the desired comonomer content in the resultant polymer.

However, at such low concentrations of comonomer in the gas phase small changes in the comonomer concentration can have a relatively large impact on the ratio of the concentration of the comonomer to the concentration of principal olefin, increasing the concentration gradients within the fluidised bed.

BRIEF DESCRIPTION OF THE DRAWINGS

The present invention may be exemplified by FIGS. 1 and 2, wherein.

DETAILED DESCRIPTION OF THE INVENTION

Figure 1:
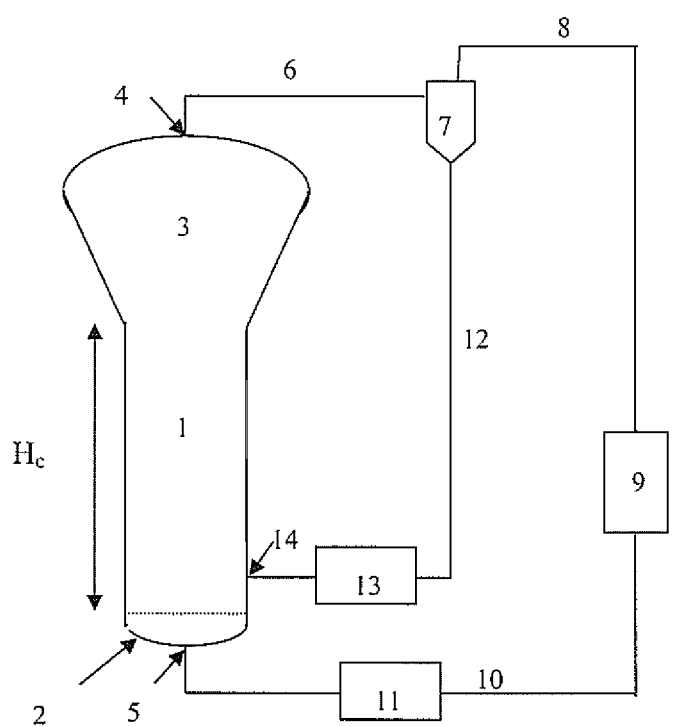
FIG. 1 shows a fluidised bed polymerisation apparatus for performing the process according to the present invention.

With respect to FIG. 1, there is shown an apparatus comprising a vertically orientated cylindrical reaction zone (1) with a fluidisation grid (2) and having a height $H_c$ from the fluidisation grid to the top of the cylindrical section, and with a disengagement zone (3), being an area of expanded cross-section compared to the cylindrical section, connected to the top of the cylindrical section. A gas outlet (4) is provided at the top of the disengagement zone (3).

Fluidising gas is passed to the reaction zone (1) via a fluidising gas inlet (5) located below the fluidisation grid (2). The fluidising gas is removed from the gas outlet (4) and passed via line (6) to a cyclone (7). From said cyclone there is recovered a gas stream via line (8), which is passed to a cooling stage (9), and from which is recovered a cooled recycle stream which is passed via line (10) and compressor (11) to the inlet (5).

Also from the cyclone, there are recovered separated solids, which are reinjected via line (12), compressor (13) and fines inlet (14) into the lower half of the reaction zone (1).

Figures 2A, 2B:
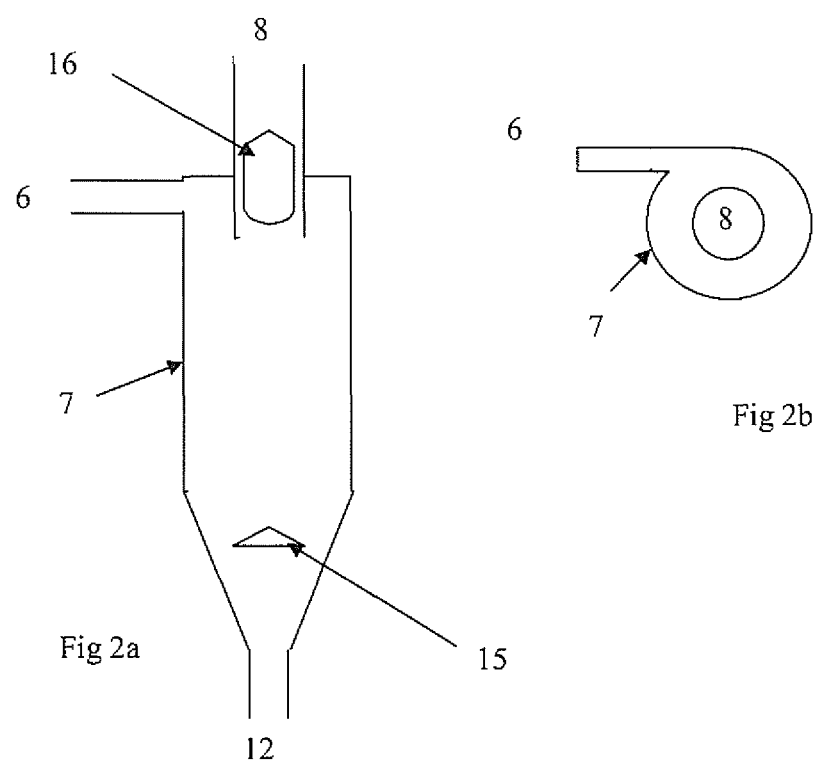
FIG. 2 shows a preferred configuration of the cyclone.

With respect to FIG. 2, there is shown in FIG. 2a an inlet line (6), a gas outlet line (8) and solids outlet via line (12). Within the cyclone (7) are present a vortex stabiliser (15), in the form of an inverted cone, and within the gas outlet (8) an insert (16), which aids the separation efficiency of the cyclone, reducing the pressure drop and vibration of the cyclone. FIG. 2b shows a top-view of the cyclone (7), showing the inlet line (6) and gas outlet line (8). The cyclone insert (16) is not shown for clarity.

The present invention will now be illustrated by the following Examples.

EXAMPLES

A series of reactions have been simulated in an industrial reactor of 5.5 m diameter with process conditions selected to give the target product properties.

The bed height used in all model runs is 22 meters.

Example 1

Metallocene Catalyst

In a first set of experiments, a metallocene catalyst was simulated using ethylene and 1-hexene, in the presence of hydrogen, to produce a polyethylene having a density of 918 kg/m3 and a melt index of 3.5 g/10 min.

The reactor conditions were selected for two different production rates. As a comparative example, the process was simulated at a production rate of 30 tonnes/hour, corresponding to a space-time yield (STY) of 57 kg/hr/m3. A condensation rate of 7.3 wt % was used. Under these conditions the ratio of hydrogen:ethylene at the top of the fluidised bed compared to the ratio of hydrogen:ethylene at the base of the fluidised bed was 1.022 i.e. there was a 2% difference in the ratio. (A value of 1 indicates the same ratio of components at both the top and base of the fluidised bed). Similarly, the ratio of 1-hexene:ethylene at the top of the fluidised bed compared to the ratio of 1-hexene:ethylene at the base of the fluidised bed was 0.845 i.e. there was a 15% reduction in the ratio.

Whilst not insignificant, under these conditions a uniform operation was obtained. The production rate was then simulated at 66 tonnes/hour, corresponding to a space-time yield (STY) of 126 kg/hr/m3. A condensation rate of 17 wt % was used. Under these conditions the ratio of hydrogen:ethylene at the top of the fluidised bed compared to the ratio of hydrogen:ethylene at the base of the fluidised bed was 1.051 i.e. there was a 5% difference in the ratio. Similarly, the ratio of 1-hexene:ethylene at the top of the fluidised bed compared to the ratio of 1-hexene:ethylene at the base of the fluidised bed was 0.644 i.e. there was a 35% reduction in the ratio.

Example 2

Ziegler-Natta Catalyst

In a second set of simulations, a Ziegler-Natta catalyst was used to react ethylene and 1-hexene, in the presence of hydrogen, to produce a polyethylene having a density of 936 kg/m3, melt index of 0.9 g/10 min.

The reactor was again operated at two different production rates. As a comparative example, the process was operated at a production rate of 30 tonnes/hour, corresponding to a space-time yield (STY) of 57 kg/hr/m3. A condensation rate of 1 wt % was used. Under these conditions the ratio of hydrogen:ethylene at the top of the fluidised bed compared to the ratio of hydrogen:ethylene at the base of the fluidised bed was 1.05 i.e. there was a 5% difference in the ratio. Similarly, the ratio of 1-hexene:ethylene at the top of the fluidised bed compared to the ratio of 1-hexene:ethylene at the base of the fluidised bed was 1.04 i.e. there was a 4% increase in the ratio.

Whilst not insignificant, under these conditions a uniform operation was obtained. The production rate was then simulated at 75 tonnes/hour, corresponding to a space-time yield (STY) of 143 kg/hr/m3. A condensation rate of 17% was used. Under these conditions the ratio of hydrogen:ethylene at the top of the fluidised bed compared to the ratio of hydrogen:ethylene at the base of the fluidised bed was 1.135 i.e. there was a 13.5% difference in the ratio. Similarly, the ratio of 1-hexene:ethylene at the top of the fluidised bed compared to the ratio of 1-hexene:ethylene at the base of the fluidised bed was 1.108 i.e. there was a 10.8% increase in the ratio.

Example 3

Ziegler-Natta Catalyst

In a third set of simulations, a Ziegler-Natta catalyst was again used to react ethylene and 1-hexene, in the presence of hydrogen, this time to produce a polyethylene having a density of 918 kg/m3, melt index 3 g/10 min.

The reactor was again simulated at two different production rates. As a comparative example, the process was simulated at a production rate of 30 tonnes/hour. No condensation was used. Under these conditions the ratio of hydrogen:ethylene at the top of the fluidised bed compared to the ratio of hydrogen:ethylene at the base of the fluidised bed was 1.115 i.e. there was an 11.5% difference in the ratio. Similarly, the ratio of 1-hexene:ethylene at the top of the fluidised bed compared to the ratio of 1-hexene:ethylene at the base of the fluidised bed was 1.025 i.e. there was a 2.5% increase in the ratio. Whilst not insignificant, under these conditions a uniform operation was obtained.

The production rate was then simulated at 60 tonnes/hour, corresponding to a space-time yield (STY) of 115 kg/hr/m3. A condensation rate of 17% was used. Under these conditions the ratio of hydrogen:ethylene at the top of the fluidised bed compared to the ratio of hydrogen:ethylene at the base of the fluidised bed was 1.115 i.e. there was a 11.5% difference in the ratio, the same as at the lower production rate. Similarly, the ratio of 1-hexene:ethylene at the top of the fluidised bed compared to the ratio of 1-hexene:ethylene at the base of the fluidised bed was 1.054 i.e. there was a 5.4% increase in the ratio.

From the above examples, it is clear that a significantly less uniform fluidised bed is obtained at increased production rates. This is particularly so when utilising metallocene catalysts, as exemplified by Example 1, when a 35% reduction in the ratio of 1-hexene:ethylene at the top of the fluidised bed compared to the ratio of 1-hexene:ethylene at the base of the fluidised bed.

This can lead to the problems defined herein, including significant variations is polymer properties for polymers "produced" in different parts of the bed and agglomeration in the reactor, if fines are recycled to the upper regions of the fluidised bed.

The invention claimed is:

1. A process for the gas phase polymerisation of olefins in a gas phase reactor, said process comprising:
   a) polymerising an olefin in a reaction zone in which a bed of polymer particles is maintained in an agitated state by passing a fluid stream through the bed,
   b) withdrawing the fluid stream from the reactor after it has passed through the bed of polymer particles,
   c) separating entrained solids from the withdrawn fluid stream,
   d) returning the separated entrained solids to the reaction zone, wherein:
   1) the polymer production rate of the process is at least 40 tonnes/hour, and
   2) the separated solids from step (c) are returned to the lower half of the bed of polymer particles in the reaction zone.

2. A process according to claim 1 which also comprises the step of recycling the withdrawn fluid stream to the reaction zone via a recycle loop, said recycle loop comprising at least one stage wherein at least a portion of the withdrawn fluid stream is cooled.

3. A process according to claim 1 wherein the solids separation step (c) is performed in a cyclone.

4. A process according to claim 1 wherein the bed of polymer particles is maintained in the fluidised or sub-fluidised state.

5. A process according to claim 3 wherein the reactor comprises a grid which acts as the base of the bed of polymer particles and to support the polymer particles when not being maintained in the agitated state and through which grid the fluid stream enters into the bed of polymer particles in order to maintain it in said agitated state, the bed of polymer particles having a height measured from said grid to the top of the agitated bed denoted as $H_b$, and the separated solids from the cyclone are returned to the reaction zone at a height of less than $0.25 \times H_b$ above the grid.

6. A process according to claim 5 wherein the separated solids from the cyclone are returned to the reaction zone at a height of between $0.05 \times H_b$ and $0.25 \times H_b$ above the grid.

7. A process according to claim 1 wherein the reactor comprises a grid which acts as the base of the bed of polymer particles and to support the polymer particles when not being maintained in the agitated state and through which grid the fluid stream enters into the bed of polymer particles in order to maintain it in said agitated state, and the reactor comprises a vertically orientated cylindrical section with a fluidisation grid defining its base and the cylindrical section having a height $H_c$ from the fluidisation grid to the top of the cylindrical section, with a disengagement zone connected to the top of the cylindrical section.

8. A process according to claim 7 wherein the separated solids are reintroduced into the reactor at a height of less than $0.5 \times H_c$, for example less than $0.4 \times H_c$, or even less than $0.1 \times H_c$.

9. A process according to claim 7 wherein the separated solids are reintroduced into the reactor at a height of more than $0.01 \times H_c$.

10. A process as claimed in claim 1 wherein both the fresh catalyst and some or all of the cooled recycle stream are introduced into the fluidised bed at the base of or in the lower quarter of the fluidised bed.

11. A process as claimed in claim 1 wherein the separated solids are introduced into the fluidised bed continuously.

12. A process as claimed in claim 11 wherein the separated solids are introduced against the pressure in the lower portion of the fluidised bed using a compressor providing a motive gas to inject the separated solids continuously.

13. A process as claimed in claim 1 wherein the polymerisation process is a "condensed mode" polymerisation process wherein at least a portion of the total feed introduced to the reactor is provided in the form of a liquid which vaporises inside the fluidised bed.

14. A process as claimed in claim 1 wherein all or a portion of the gases in the recycle loop are cooled such that at least a portion of the gases are condensed to form a liquid such that at least a portion of said condensed liquid is reintroduced into the base of or the lower quarter of the fluidised bed.

15. A process as claimed in claim 14 wherein the process is operated with a level of condensation of at least 10 wt %.

16. A process according to claim 3 wherein the cyclone has a cylindrical horizontal internal cross-section, the cross-section being smaller at the bottom of the cyclone than at the top, and which cyclone comprises
 (1) a gas inlet located in the upper half of the cyclone which provides introduction of the fluidising gas comprising solids in a horizontal direction and tangentially to the cyclone inner wall at its point of introduction,
 (2) a gas outlet located centrally at the top of the cyclone, and
 (3) a solids outlet located centrally at the base of the cyclone,
 where the gas outlet comprises a cylindrical pipe which extends vertically downwards into the cyclone to a height below the location of the gas inlet, such that the gas entering the cyclone through the gas inlet enters into an annular area between the cyclone wall and the cylindrical pipe forming the gas outlet.

17. A process according to claim 16 wherein the cyclone also comprises a vortex centraliser, in the form of an inverted cone, in the base of the cyclone and an insert in the cylindrical pipe of the gas outlet which reduces vibration and pressure drop across the cyclone.

\* \* \* \* \*